(12) United States Patent
Mach

(10) Patent No.: US 6,553,897 B2
(45) Date of Patent: Apr. 29, 2003

(54) STEAMER FOR PASTRIES AND THE PASTRIES TO BE STEAMED THEREBY

(76) Inventor: Irena Mach, 3415 Neptune Ave., #912, Brooklyn, NY (US) 11224

( * ) Notice: Subject to any disclaimer, the term of this patent is extended or adjusted under 35 U.S.C. 154(b) by 19 days.

(21) Appl. No.: 09/768,601

(22) Filed: Jan. 25, 2001

(65) Prior Publication Data

US 2002/0096129 A1 Jul. 25, 2002

(51) Int. Cl.[7] ............ A47J 37/00; A47J 37/12; A47J 43/18
(52) U.S. Cl. ............ 99/413; 99/417; 99/426; 99/339
(58) Field of Search ............ 99/410, 413, 426, 99/440, 439, 339, 340, 417; 126/369

(56) References Cited

U.S. PATENT DOCUMENTS 3,808,963 A * 5/1974 Ludena ............ 99/417
4,462,308 A * 7/1984 Wang ............ 99/413
5,584,232 A * 12/1996 Bush ............ 99/340

* cited by examiner

Primary Examiner—Reginald L. Alexander

(57) ABSTRACT

A steamer for pastries and the pastries to be steamed thereby. The steamer includes primary and secondary receptacles, a lid, and a mold. The primary receptacle holds water therein that is turned into steam when the primary receptacle is heated. The lid selectively closing the primary receptacle. The secondary receptacle is steam permeable and holds the pastries to be steamed above the water in the primary receptacle, and is disposed in the primary receptacle. The mold contains the pastries and is hingedly attached to the secondary receptacle so as to allow the mold to pivot upwardly from the secondary receptacle for insertion of, and removal of, the pastries, and has a piece of perforated material that allows the steam to pass therethrough, as opposed to being trapped therein, and as result thereof, provides the pastries with a pleasing texture. The pastries include flour, yeast, sugar, milk, salt, and either butter or margarine.

11 Claims, 1 Drawing Sheet

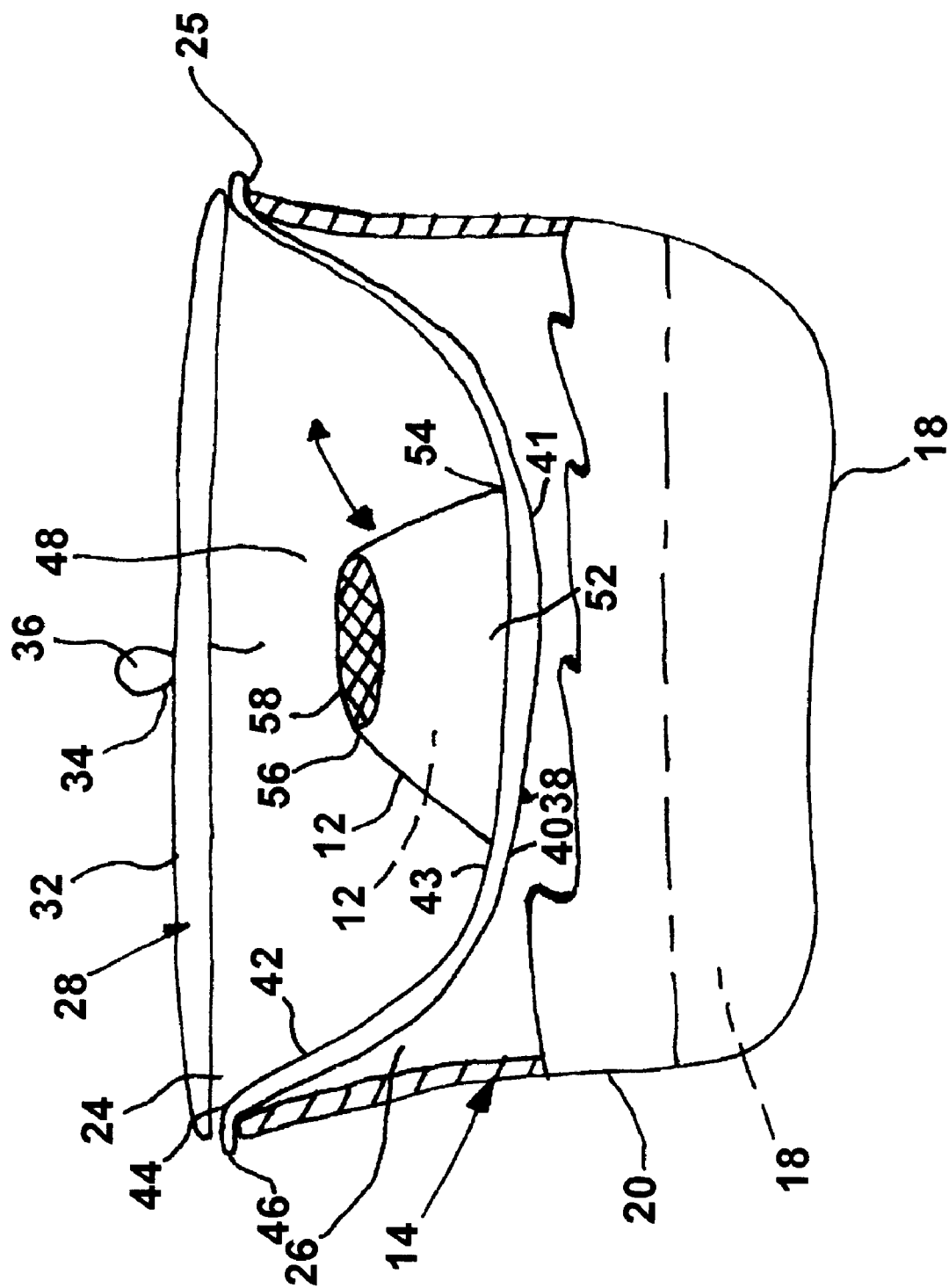

STEAMER FOR PASTRIES AND THE PASTRIES TO BE STEAMED THEREBY

BACKGROUND OF THE INVENTION

1. Field of the Invention:

The present invention relates to a steamer for pastries. More particularly, the present invention relates to a steamer for pastries and the pastries to be steamed thereby.

2. Description of the Prior Art:

Numerous innovations for food related items have been provided in the prior art that will be described. Even though these innovations may be suitable for the specific individual purposes to which they address, however, they differ from the present invention.

FOR EXAMPLE, U.S. Pat. No 5,466,476 to Finkel et al. teaches a process for making a pastry dough, and in particular for making a pie crust dough. The process involves making two phases, a dough like mixture of flour, water, salt, and oil, and a shortening, starch, and polyol phase. These phases are laminated to make a heterogeneous pastry dough which has a flaky tender texture when baked. This dough composition is made in a manner which is largely independent of processing temperatures and mix times. The dough is characterized by having multiple, discontinuous layers which are interrupted by regions of gluten and the starch/fat/polyol phase.

ANOTHER EXAMPLE, U.S. Pat. No. 5,514,395 to Burger teaches a filled bagel dough product that has a hollow spherical shell filled with cream cheese. The dough is formed into an open ball, which is sealed after insertion of a scoop of cream cheese. The filled ball is steamed to skin outer and inner crusts, then baked to provide a dense crumb. The resulting product is freezable for long shelf-life.

STILL ANOTHER EXAMPLE, U.S. Pat. No. 5,631,033 to Kolvites teaches a modulated steam cooker in which food to be cooked is received in an oven chamber having an access door associated with a door switch. Steam is fed directly into the oven by a steam generator having an electric heater immersed in a pool of water. The heater is connected through the door switch to a power source whereby the generator is powered only when the door is shut. The pressure of steam draining from the oven is sensed by a pressure-responsive switch interposed between the heater and the power source. The pressure switch intermittently interrupts the power supplied to the heater only when the sensed pressure exceeds a predetermined level somewhat above atmospheric pressure, thereby modulating the generation of steam supplied to the oven as a function of the quantity and temperature of food therein to effect efficient cooking of the food. Mounted on the steam generator is a spray head supplied with water only when the door is opened. The head then emits a spray of water which quenches the steam in the generator. The resultant pressure drop causes steam to be sucked back from the oven into the steam generator whereby little steam escapes from the opened door and the person opening the door is not subjected to hazardous steam.

YET ANOTHER EXAMPLE, U.S. Pat. No. 5,654,021 to Burger teaches a process of making a filled bagel dough product and the product formed thereby. One process comprises the steps of mixing and kneading a quantity of bagel dough, including yeast; sealing a filler, such as cream cheese, within a bagel dough shell; proofing the product, steaming the product, and browning the product. The product optionally is frozen after either of the steaming or browning steps. The process is preferably used to produce a novel relatively large (half pound) platelet shaped filled bagel dough product, preferably with toppings.

It is apparent that numerous innovations for food related items have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a steamer for pastries and the pastries to be steamed thereby that avoids the disadvantages of the prior art.

ANOTHER OBJECT of the present invention is to provide a steamer for pastries and the pastries to be steamed thereby that is simple and inexpensive to manufacture.

STILL ANOTHER OBJECT of the present invention is to provide a steamer for pastries and the pastries to be steamed thereby that is simple to use.

BRIEFLY STATED, YET ANOTHER OBJECT of the present invention is to provide a steamer for pastries and the pastries to be steamed thereby. The steamer includes primary and secondary receptacles, a lid, and a mold. The primary receptacle holds water therein that is turned into steam when the primary receptacle is heated. The lid selectively closing the primary receptacle. The secondary receptacle is steam permeable and holds the pastries to be steamed above the water in the primary receptacle, and is disposed in the primary receptacle. The mold contains the pastries and is hingedly attached to the secondary receptacle so as to allow the mold to pivot upwardly from the secondary receptacle for insertion of, and removal of, the pastries, and has a piece of perforated material that allows the steam to pass therethrough, as opposed to being trapped therein, and as result thereof, provides the pastries with a pleasing texture. The pastries include flour, yeast, sugar, milk, salt, and either butter or margarine.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The sole FIGURE of the drawing is a fragmented diagrammatic side elevational view of the steamer of the present invention.

LIST OF REFERENCE NUMERALS UTILIZED IN THE DRAWING

10 steamer of present invention for pastries and pastries 12 to be steamed thereby
12 pastries to be steamed by steamer 10 of present invention
14 primary receptacle for being heated and for holding water 16 therein
16 water held in primary receptacle 14
18 bottom wall of primary receptacle 14
20 longitudinal side wall of primary receptacle 14
24 top of primary receptacle 14

25 rim defining top 24 of primary receptacle 14
26 chamber contained in primary receptacle 14 for holding water 16 therein
28 lid
30 inner surface of lid 28
32 outer surface of lid 28 for facing ambient
34 center of outer surface 32 of lid 28
36 handle of lid 28 for facilitating movement of lid 28
38 secondary receptacle for being steam permeable and holding pastries 12 to be steamed above water 16 in primary receptacle 14
40 bottom wall of secondary chamber 38
41 lower surface of bottom wall 40 of secondary receptacle 38
42 longitudinal side wall of secondary chamber 38
43 upper surface of bottom wall 40 of secondary receptacle 38
44 top of secondary chamber 38
46 lip defining top 44 of secondary chamber 38
48 chamber in secondary receptacle 38 for holding pastries 12 therein
50 mold for containing and forming pastries 12
52 base of mold 50
54 hinge of mold 50
56 apex of mold 50
58 piece of material of mold 50 being perforated for allowing steam to pass through mold 50, as opposed to being trapped in mold 50, and as result thereof, provides pastries 12 with pleasing texture.

DETAILED DESCRIPTION OF THE PREFERRED EMBODIMENT

Referring now to the FIGURES, in which like numerals indicate like parts, and particularly to the sole FIGURE, which is a fragmented diagrammatic side elevational view of the steamer of the present invention, the steamer of the present invention is shown generally at 10 for pastries and the pastries 12 to be steamed thereby.

The configuration of the steamer 10 can best be seen in the sole FIGURE, which again is a fragmented diagrammatic side elevational view of the steamer of the present invention, and as such, will be discussed with reference thereto.

The steamer 10 comprises a primary receptacle 14 for being heated and-for holding water 16 therein, with the water 16 being turned into steam when said primary receptacle 14 is heated, and as a result thereof, steaming the pastries 12.

The primary receptacle 14 is cylindrically-shaped.

The primary receptacle 14 has a bottom wall 18 that is circular-shaped and horizontally-oriented, and a longitudinal side wall 20 that is cylindrically-shaped and vertically oriented, and which extends upwardly from the bottom wall 18 thereof, to a top 24 that is open, circular-shaped, and defined by a rim 25.

The primary receptacle 14 contains a chamber 26 for holding the water 16 therein, and which is defined by the bottom wall 18 thereof and the longitudinal side wall 20 thereof, and which communicates with, and opens into, the top 24 thereof.

The steamer 10 further comprises a lid 28 that is circular-shaped, and which selectively closes the top 24 of the primary receptacle 14.

The lid 28 has an inner surface 30 that faces the chamber 26 in the primary receptacle 14 and an outer surface 32, for facing the ambient and which has a center 34.

The lid 28 further has a handle 36 for facilitating movement thereof, and which extends upwardly from the center 34 of the outer surface 32 thereof.

The steamer 10 further comprises a secondary receptacle 38 for being steam permeable and holding the pastries 12 to be steamed above the water 16 in the primary receptacle 14, and which is disposed in the chamber 26 in, and concentrically with, the primary receptacle 14.

The secondary receptacle 38 is inverted-conically-frustum-shaped.

The secondary receptacle 38 has a bottom wall 40 that is circular-shaped and horizontally-oriented, and a longitudinal side wall 42 that is vertically oriented, and which extends flaringly upwardly from the bottom wall 40 thereof, to a top 44 that is open, circular-shaped, and defined by a lip 46 that replaceably rests on the rim 25 of the top 24 of the primary receptacle 14 so as to allow the secondary receptacle 38 to be selectively suspended in, and removed from, the chamber 34 in the primary receptacle 14.

The bottom wall 40 of the secondary receptacle 38 has a lower surface 41 that faces the bottom wall 18 of the primary receptacle 14 and an upper surface 43 that faces the lid 28.

The bottom wall 40 of the secondary receptacle 38 is disposed intermediate, and parallel, to the bottom wall 18 of the primary receptacle 14 and the top 24 of the primary receptacle 14.

The secondary receptacle 38 contains a chamber 48 for holding the pastries 12 therein, and which is defined by the bottom wall 40 thereof and the longitudinal side wall 42 thereof, and which communicates with, and opens into, the top 44 thereof.

The steamer 10 further comprises a mold 50 for containing and forming the pastries-12, and which is hemispherically-shaped.

The mold 50 has a base 52 that is flat, open, and hingedly attached, by a hinge 54, to the upper surface 43 of the bottom wall 40 of the secondary receptacle 38 so as to allow the mold 50 to pivot upwardly from the bottom wall 40 of the secondary receptacle 38 for insertion of the pastries 12 to be steamed therein and for removal of the pastries 12 steamed therefrom.

The mold 50 further has an apex 56 that is circular-shaped and open.

The mold 50 further has piece of material 58 that is hemispherically-shaped and disposed coaxially on, and closes, the apex 56 of the mold 50.

The piece of material 58 of the mold 50 is perforated for allowing the steam to pass through the mold 50, as opposed to being trapped in the mold 50, and as result thereof, provides the pastries 12 with a pleasing texture.

The piece of material 58 of the mold 50 is made of mesh.

The pastries 12 to be steamed by the steamer 10 comprise a dough that is rolled into a soft ball, and whose ingredients comprise flour, yeast, sugar, milk, salt, and one of butter and margarine.

It will be understood that each of the elements described above, or two or more together, may also find a useful application in other types of constructions differing from the types described above.

While the invention has been illustrated and described as embodied in a steamer for pastries and the pastries to be steamed thereby, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A steamer for pastries, comprising:
  a) a primary receptacle for being heated and for holding water therein, with the water being turned into steam when said primary receptacle is heated, and as a result thereof, steaming the pastries;
    wherein said primary receptacle has:
      i) a bottom wall that is circular-shaped and horizontally-oriented; and
      ii) a longitudinal side wall that is cylindrically-shaped and vertically oriented, and which extends upwardly from said bottom wall thereof, to a top that is open, circular-shaped, and defined by a rim;
    wherein said primary receptacle contains a chamber for holding the water therein, and which is defined by said bottom wall thereof and said longitudinal side wall thereof, and which communicates with, and opens into, said top thereof;
  b) a lid being circular-shaped and selectively closing said top of said primary receptacle;
  c) a secondary receptacle for being steam permeable and holding the pastries to be steamed above the water in said primary receptacle, and being disposed in said chamber in, and concentrically with, said primary receptacle;
    wherein said secondary receptacle has:
      i) a bottom wall that is circular-shaped and horizontally-oriented; and
      ii) a longitudinal side wall that is vertically oriented, and which extends flaringly upwardly from said bottom wall thereof, to a top that is open, circular-shaped, and defined by a lip that replaceably rests on said rim of said top of said primary receptacle so as to allow said secondary receptacle to be selectively suspended in, and removed from, said chamber in said primary receptacle;
    wherein said bottom wall of said secondary receptacle has:
      i) a lower surface that faces said bottom wall of said primary receptacle; and
      ii) an upper surface that faces said lid;
  d) a mold for containing and forming the pastries, and being hemispherically-shaped; and
    wherein said mold has a base that is flat, open, and hingedly attached, by a hinge, to said upper surface of said bottom wall of said secondary receptacle so as to allow said mold to pivot upwardly from said bottom wall of said secondary receptacle for insertion of the pastries to be steamed therein and for removal of the pastries steamed therefrom.

2. The steamer as defined in claim 1, wherein said primary receptacle is cylindrically-shaped.

3. The steamer as defined in claim 1, wherein said lid has:
  a) an inner surface that faces said chamber in said primary receptacle; and
  b) an outer surface for facing the ambient, and which has a center.

4. The steamer as defined in claim 3, wherein said lid further has a handle for facilitating movement thereof, and which extends upwardly from said center of said outer surface thereof.

5. The steamer as defined in claim 1, wherein said secondary receptacle is inverted-conically-frustum-shaped.

6. The steamer as defined in claim 1, wherein said bottom wall of said secondary receptacle is disposed intermediate, and parallel, to said bottom wall of said primary receptacle and said top of said primary receptacle.

7. The steamer as defined in claim 1, wherein said secondary receptacle contains a chamber for holding the pastries therein, and which is defined by said bottom wall thereof and said longitudinal side wall thereof, and which communicates with, and opens into, said top thereof.

8. The steamer as defined in claim 1, wherein said mold has an apex that is circular-shaped and open.

9. The steamer as defined in claim 8, wherein said mold further has piece of material that is hemispherically-shaped and disposed coaxially on, and closes, said apex of said mold.

10. The steamer as defined in claim 9, wherein said piece of material of said mold is perforated for allowing the steam to pass through said mold, as opposed to being trapped in said mold, and as result thereof, provides the pastries with a pleasing texture.

11. The steamer as defined in claim 9, wherein said piece of material of said mold is made of mesh.

* * * * *